(12) United States Patent
Tang et al.

(10) Patent No.: US 12,546,626 B2
(45) Date of Patent: Feb. 10, 2026

(54) METHOD, APPARATUS, AND COMPUTER PROGRAM PRODUCT FOR PROBE DATA-BASED GEOMETRY GENERATION

(71) Applicant: HERE GLOBAL B.V., Eindhoven (NL)

(72) Inventors: Fei Tang, Aarau (CH); Bala Divakaruni, Chicago, IL (US); Ole Henry Dorum, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 17/662,158

(22) Filed: May 5, 2022

(65) Prior Publication Data
US 2023/0358564 A1   Nov. 9, 2023

(51) Int. Cl.
*G01C 21/00*   (2006.01)
*G06T 11/00*   (2006.01)
*G06V 20/10*   (2022.01)

(52) U.S. Cl.
CPC ..... *G01C 21/3859* (2020.08); *G01C 21/3841* (2020.08); *G01C 21/3889* (2020.08); *G06T 11/00* (2013.01); *G06V 20/182* (2022.01)

(58) Field of Classification Search
None
See application file for complete search history.

(56) References Cited

U.S. PATENT DOCUMENTS

| | | | |
|---|---|---|---|
| 8,949,021 B2 | 2/2015 | Witmer | |
| 9,171,485 B2 | 10/2015 | Gautama et al. | |
| 9,177,404 B2 | 11/2015 | Ramachandran et al. | |
| 9,658,074 B2 | 5/2017 | Dorum | |
| 10,266,280 B2 | 4/2019 | Derenick et al. | |
| 10,444,020 B2 | 10/2019 | Dorum | |
| 10,546,400 B2 | 1/2020 | Dorum | |
| 10,580,292 B2 | 3/2020 | Dorum | |

(Continued)

FOREIGN PATENT DOCUMENTS

| | | | | |
|---|---|---|---|---|
| CN | 101924647 A | 12/2010 | | |
| CN | 107743431 A | * 2/2018 | ............ | B23Q 17/00 |

(Continued)

OTHER PUBLICATIONS

"Derek Marshall, Probe data analysis for identifying a property of the scan path, 2018" NPL attached (Year: 2018).*

(Continued)

*Primary Examiner* — Abby J Flynn
*Assistant Examiner* — Bakari Underwood
(74) *Attorney, Agent, or Firm* — ALSTON & BIRD LLP

(57) ABSTRACT

A method is provided for generation of map geometry through rasterization of probe data over time, where the generated map geometry can be used for map element generation. Methods may include: receiving probe data from a plurality of probe apparatuses within a geographic area where the probe data includes location information and time information; rasterizing the received probe data to generate an image corresponding to the probe data associated with the geographic area, where each pixel of the image includes a property representing at least one component of the probe data; processing the image to obtain one or more map elements; and updating a map database with the one or more map elements.

19 Claims, 4 Drawing Sheets

(56) References Cited

U.S. PATENT DOCUMENTS

| | | |
|---|---|---|
| 10,760,920 B2 | 9/2020 | Sekiyama |
| 11,030,476 B2 | 6/2021 | Xu et al. |
| 11,068,515 B2 | 7/2021 | Bukowski |
| 11,093,760 B2 | 8/2021 | Savla et al. |
| 11,192,558 B2 | 12/2021 | Thompson |
| 11,209,548 B2 | 12/2021 | Yang et al. |
| 11,210,537 B2 | 12/2021 | Koivisto et al. |
| 11,227,500 B2 | 1/2022 | Wang |
| 11,244,500 B2 | 2/2022 | Marschner et al. |
| 2003/0009287 A1 | 1/2003 | Howard et al. |
| 2009/0210388 A1 | 8/2009 | Elson et al. |
| 2013/0033591 A1* | 2/2013 | Takahashi ............... G06T 11/00 348/61 |
| 2014/0219558 A1 | 8/2014 | Teng et al. |
| 2016/0239983 A1* | 8/2016 | Dorum ................... G01C 11/04 |
| 2016/0358477 A1 | 12/2016 | Ansari |
| 2017/0169313 A1 | 6/2017 | Choi et al. |
| 2017/0177933 A1* | 6/2017 | Mittal .................... G06F 18/22 |
| 2018/0003512 A1* | 1/2018 | Lynch ................. G01C 21/3811 |
| 2018/0107190 A1 | 4/2018 | Marshall et al. |
| 2019/0147320 A1* | 5/2019 | Mattyus ............... G06V 20/182 382/155 |
| 2019/0147331 A1 | 5/2019 | Arditi |
| 2019/0170519 A1 | 6/2019 | Anwar et al. |
| 2019/0221033 A1 | 7/2019 | Messerlie et al. |
| 2019/0258878 A1 | 8/2019 | Koivisto et al. |
| 2019/0272434 A1 | 9/2019 | Dorum |
| 2019/0287393 A1 | 9/2019 | Fowe et al. |
| 2019/0325738 A1 | 10/2019 | Dorum |
| 2019/0355103 A1 | 11/2019 | Baek et al. |
| 2020/0302223 A1 | 9/2020 | Dutta et al. |
| 2020/0410274 A1 | 12/2020 | Satoh et al. |
| 2021/0012166 A1 | 1/2021 | Braley et al. |
| 2021/0019516 A1* | 1/2021 | Mittal ................. G01C 21/3819 |
| 2021/0056847 A1 | 2/2021 | Saxena et al. |
| 2021/0113130 A1 | 4/2021 | Tran |
| 2021/0150278 A1 | 5/2021 | Dudzik et al. |
| 2021/0164787 A1 | 6/2021 | Soni et al. |
| 2021/0209368 A1 | 7/2021 | Hao et al. |
| 2021/0224466 A1 | 7/2021 | Nehrenberg et al. |
| 2021/0302170 A1 | 9/2021 | Xie et al. |
| 2021/0325898 A1 | 10/2021 | Golov |
| 2021/0333124 A1 | 10/2021 | Heo et al. |
| 2021/0342585 A1 | 11/2021 | Fleisig et al. |
| 2022/0113162 A1 | 4/2022 | Nomura |
| 2022/0156612 A1 | 5/2022 | Ren et al. |
| 2022/0198339 A1 | 6/2022 | Zhao et al. |
| 2022/0277647 A1 | 9/2022 | Guo et al. |
| 2022/0366259 A1 | 11/2022 | Wang et al. |
| 2023/0213945 A1 | 7/2023 | Sajjan et al. |
| 2023/0221136 A1 | 7/2023 | Rodrigues |
| 2023/0252795 A1 | 8/2023 | Tong et al. |

FOREIGN PATENT DOCUMENTS

| | | | | |
|---|---|---|---|---|
| EP | 3280974 A1 | 2/2018 | | |
| WO | WO-2011023247 A1 * | 3/2011 | ........... | G01C 15/002 |
| WO | WO 2016/162665 A1 | 10/2016 | | |
| WO | WO 2021/002190 A1 | 1/2021 | | |

OTHER PUBLICATIONS

Agmon et al, "An algorithm for finding the distribution of maximal entropy", Journal of Computational Physics, vol. 30, No. 2 (Feb. 1979), 9 pages.

Alotaibi A., "Deep Generative Adversarial Networks for Image-to-Image Translation: A Review", Symmetry, vol. 12, No. 10, (Oct. 16, 2020), 26 pages.

Arman et al., "Lane-level routable digital map reconstruction for motorway networks using low-precision GPS data", Transportation Research Part C: Emerging Technologies, (Jun. 3, 2021), 21 pages.

Batra, A., "Road Topology Extraction from Satellite Images by Knowledge Sharing", International Institute of Information Technology, Deemed University, (Jul. 2019), 75 pages.

Biagioni et al., "Inferring Road Maps from Global Positioning System Traces: Survey and Comparative Evaluation", Department of Computer Science, University of Illinois at Chicago, (2012), 11 pages.

Chen et al., "Probabilistic Modeling of Traffic Lanes from GPS Traces", 18th ACM SIGSPATIAL International Symposium on Advances in Geographic Information Systems, ACM-GIS 2010, (Nov. 3-5, 2010), 8 pages.

Dorum, O., "Deriving Double-Digitized Road Network Geometry from Probe Data", SIGSPATIAL '17: Proceedings of the 25th ACM SIGSPATIAL International Conference on Advances in Geographic Information Systems, (Nov. 2017), 10 pages.

Hartmann et al., "Night time road curvature estimation based on convolutional neural networks", 2013 IEEE Intelligent Vehicles Symposium (IV), (Jun. 23-26, 2013), 6 pages.

He et al., "Sat2Graph: Road Graph Extraction through Graph-Tensor Encoding", arXiv:2007.09547v1, (Jul. 19, 2020), 17 pages.

Horritt et al., "Developing a Prototype Tool for Mapping Flooding From All Sources Phase 1: Scoping and Conceptual Method Development", Department for Environment Food and Rural Affairs, Flood and Coastal Erosion Risk Management Research and Development Programme, Environment Agency, (Mar. 2010), 179 pages.

Kaji et al., "Overview of Image-To-Image Translation by Use of Deep Neural Networks: Denoising, Super-Resolution, Modality Conversion, and Reconstruction in Medical Imaging", Radiological Physics and Technology 12(4), (Jun. 2019), 14 pages.

Kupyn et al., "DeblurGAN-v2: Deblurring (Orders-of-Magnitude) Faster and Better", 2019 IEEE/CVF International Conference on Computer Vision (ICCV), (2019), 10 pages.

Kupyn et al., "DeblurGAN: Blind Motion Deblurring Using Conditional Adversarial Networks", 2018 IEEE/CVF Conference on Computer Vision and Pattern Recognition, (Nov. 19, 2017), pp. 8183-8192.

Mi et al., "HDMapGen: A Hierarchical Graph Generative Model of High Definition Maps", 2021 IEEE/CVF Conference on Computer Vision and Pattern Recognition (CVPR), (Jun. 1, 2021), 10 pages.

Narayan et al., "Maximum Entropy Image Restoration in Astronomy", Annual Review of Astronomy and Astrophysics, vol. 24, No. 1, (Nov. 2003), 44 pages.

Redmon et al., "YOLO: Real-Time Object Detection", Retrieved on Oct. 18, 2022, Retrieved from the Internet: URL<https://pjreddie.com/darknet/yolo>, (2018), 9 pages.

Spolti et al., "Application of U-Net and Auto-Encoder to the Road/Non-Road Classification of Aerial Imagery in Urban Environments", 15th International Conference on Computer Vision Theory and Applications, (Jan. 2020), 8 pages.

Vu, "Vehicle Perception: Localization, Mapping with Detection, Classification and Tracking of Moving Objects", Computer Science, Institut National Polytechnique de Grenoble—INPG, (2009), 127 pages.

Xiao et al., "VAE-info-cGAN: generating synthetic images by combining pixel-level and feature-level geospatial conditional inputs", arXiv:2012.04196v1, (Dec. 8, 2020), 10 pages.

Zhang et al., "A Fast Learning Method for Accurate and Robust Lane Detection Using Two-Stage Feature Extraction with YOLO v3", Sensors 2018 (Dec. 6, 2018), 20 pages.

U.S. Appl. No. 17/662,165, filed May 5, 2022, entitled, "Method, Apparatus, And Computer Program Product For Map Data Generation From Probe Data Imagery", 43 pages.

U.S. Appl. No. 17/662,129, filed May 5, 2022, entitled, "Method, Apparatus, And Computer Program Product For Map Geometry Generation Based On Object Detection", 40 pages.

U.S. Appl. No. 17/662,151, filed May 5, 2022, entitled, "Method, Apparatus, And Computer Program Product For Map Geometry Generation Based On Data Aggregation And Conflation With Statistical Analysis", 35 pages.

U.S. Appl. No. 17/662,136, filed May 5, 2022, entitled, "Method, Apparatus, And Computer Program Product For Lane Geometry Generation Based On Graph Estimation", 40 pages.

(56) References Cited

OTHER PUBLICATIONS

U.S. Appl. No. 17/662,144, filed May 5, 2022, entitled, "Method, Apparatus, And Computer Program Product For Map Geometry Generation Based On Data Aggregation And Conflation", 43 pages.
Non-Final Office Action for U.S. Appl. No. 17/662,129 dated Aug. 24, 2023.
Non-Final Office Action for U.S. Appl. No. 17/662,136 dated Sep. 14, 2023.
Non-Final Office Action for U.S. Appl. No. 17/662,144 dated Jan. 5, 2024.
Extended European Search Report for European Application No. 23171578.0 dated Oct. 10, 2023, 8 pages.
Extended European Search Report for European Application No. 23171576.4 dated Oct. 6, 2023, 9 pages.
Extended European Search Report for European Application No. 23171637.4 dated Oct. 19, 2023, 7 pages.
Extended European Search Report for European Application No. 23171632.5 dated Oct. 10, 2023, 8 pages.
Final Office Action for U.S. Appl. No. 17/662,129 dated Feb. 15, 2024.
Final Office Action for U.S. Appl. No. 17/662,136 dated Mar. 27, 2024.
Advisory Action for U.S. Appl. No. 17/662,129 dated Apr. 25, 2024.
Final Office Action for U.S. Appl. No. 17/662,144 dated Jun. 18, 2024.
Final Office Action for U.S. Appl. No. 17/662,165 dated Jan. 27, 2025.
Non-Final Office Action for U.S. Appl. No. 17/662,165 dated Sep. 6, 2024.
Non-Final Office Action for U.S. Appl. No. 17/662,129 dated Jun. 5, 2024.
Non-Final Office Action for U.S. Appl. No. 17/662,136 dated Sep. 10, 2024.
Non-Final Office Action for U.S. Appl. No. 17/662,144 dated Oct. 23, 2024.
Non-Final Office Action for U.S. Appl. No. 17/662,151 dated Sep. 27, 2024.
Notice of Allowance for U.S. Appl. No. 17/662,129 dated Dec. 9, 2024.
Notice of Allowance for U.S. Appl. No. 17/662,136 dated Dec. 23, 2024.
Notice of Allowance for U.S. Appl. No. 17/662,151 dated Dec. 20, 2024.
Final Office Action for U.S. Appl. No. 17/662,144 dated Mar. 11, 2025.
Advisory Action for U.S. Appl. No. 17/662,165 dated Apr. 18, 2025.
Advisory Action for U.S. Appl. No. 17/662,144 dated May 19, 2025.
Zhang, Ying, et al. "An enhanced GAN model for automatic satellite-to-map image conversion." IEEE 2020 (Year: 2020).
Zhang, Xiangrong, et al. "Aerial image road extraction based on an improved generative adversarial network" Remote Sensing 11.8 (2019): 930. (Year:2019).
Non-Final Office Action for U.S. Appl. No. 17/662,165 dated May 28, 2025.
Non-Final Office Action for U.S. Appl. No. 17/662,144 dated Jul. 1, 2025.
Notice of Allowance for U.S. Appl. No. 17/662,144 dated Oct. 7, 2025.
Notice of Allowance for U.S. Appl. No. 17/662,165 dated Nov. 12, 2025.

\* cited by examiner

METHOD, APPARATUS, AND COMPUTER PROGRAM PRODUCT FOR PROBE DATA-BASED GEOMETRY GENERATION

TECHNOLOGICAL FIELD

An example embodiment of the present disclosure relates to the generation of map geometry, and more particularly, for generation of map geometry through rasterization of probe data over time, where the generated map geometry can be used for map element generation.

BACKGROUND

Maps have been used for centuries for providing route geometry and geographical information. Conventional paper maps including static images of roadways and geographic features from a snapshot in history have given way to digital maps used by and presented on computers, mobile devices, vehicles, etc. These digital maps can be updated and revised such that users have the most-current maps available to them each time they view a map hosted by a mapping service server. Digital maps can further be enhanced with dynamic information, such as traffic information in real time along roads and through intersections.

As digital maps, including high-definition (HD) digital maps with rich content can span entire continents, these digital maps include vast amounts of information, which can be corrupted through missing or erroneous data such as missing or erroneous lane geometry. Incorrect lane geometry information can be problematic as such lane geometry may be used for route guidance and at least semi-autonomous vehicle control. Inaccurate lane geometries can reduce the effectiveness of route guidance and vehicle autonomy.

BRIEF SUMMARY

A method, apparatus, and computer program product are provided in accordance with an example embodiment for generating and correcting lane geometry within map data, and more particularly, to generation of map geometry through rasterization of probe intensity measures over time, where the generated map geometry can be used for map element generation. Embodiments provided herein include an apparatus having at least one processor and at least one memory including computer program code with the at least one memory and computer program code being configured to, with the processor, cause the apparatus to: receive probe data from a plurality of probe apparatuses within a geographic area, where the probe data includes location information and time information; rasterize the received probe data to generate an image corresponding to the probe data associated with the geographic area, where each pixel of the image includes a property representing at least one component of the probe data; process the image to obtain one or more map elements; and update a map database with the one or more map elements.

According to an example embodiment, causing the apparatus to rasterize the received probe data to generate the image corresponding to the probe data associated with the geographic area includes causing the apparatus to rasterize the received probe data to generate a first image corresponding to a first map tile and a second image corresponding to a second map tile, where the first image overlaps the second image by a predetermined amount. The property representing at least one component of the probe data includes, in some embodiments, pixel values, where pixel values for pixels in an area of the first image overlapping the second image are inferred based on corresponding pixels in an overlapped area of the second image. According to some embodiments, pixel values for the pixels in the area of the first image overlapping the second image proximate a border of the first image are determined based on pixel values of the corresponding pixels in the overlapped area of the second image.

According to some embodiments, the property representing at least one component of the probe data includes a pixel value, and the at least one component of the probe data includes a probe density represented by the pixel value. The property representing at least one component of the probe data includes, in some embodiments, a pixel value where the at least one component of the probe data includes an average probe speed represented by the pixel value. The property representing at least one component of the probe data includes, in some embodiments, a pixel value where the at least one component of the probe data includes a predominant probe heading represented by the pixel value.

According to certain embodiments, causing the apparatus to rasterize the received probe data to generate an image corresponding to the probe data associated with the geographic area includes causing the apparatus to: normalize the received probe data based, at least in part, on a road segment along which the received probe data was captured; and rasterize the normalized received probe data to generate the image corresponding to the probe data associated with the geographic area. According to some embodiments, causing the apparatus to normalize the received probe data based, at least in part, on the road segment along which the received probe data was captured includes causing the apparatus to normalize the received probe data based, at least in part, on at least one of a functional class of the road segment along which the probe data was captured or a total volume of received probe data along the road segment along which the received probe data was captured. Causing the apparatus of some embodiments to rasterize the received probe data to generate the image corresponding to the probe data associated with the geographic area includes causing the apparatus to: normalize the received probe data based, at least in part, on a road segment along which the probe data was captured, where normalization includes sampling the received probe data at different sampling rates or at different time periods based on at least one of a functional class of the road segment along which the received probe data was captured or a volume of received probe data along the road segment along which the received probe data was captured, and rasterize the normalized received probe data to generate the image corresponding to the probe data associated with the geographic area.

Embodiments provided herein include a method including: receiving probe data from a plurality of probe apparatuses within a geographic area where the probe data includes location information and time information; rasterizing the received probe data to generate an image corresponding to the probe data associated with the geographic area, where each pixel of the image includes a property representing at least one component of the probe data; processing the image to obtain one or more map elements; and updating a map database with the one or more map elements. The geographic area of an example embodiment is a first geographic area, the method further including: receiving a ground truth image of labeled road feature representations, where the ground truth image covers a second geographic area, at least partially overlapping the first geographic area, where processing the image to obtain one or more map elements includes processing the image and the ground truth image using a generator network to generate one or more map elements within the image.

According to some embodiments, the property representing at least one component of the probe data includes a pixel value, where the at least one component of the probe data includes a probe density represented by the pixel value. The property representing at least one component of the probe data includes, in some embodiments, a pixel value where the at least one component of the probe data includes an average probe speed represented by the pixel value. The property representing at least one component of the probe data includes, in certain embodiments, a pixel value where the at least one component of the probe data includes a predominant probe heading represented by the pixel value.

According to certain embodiments, rasterizing the received probe data to generate an image corresponding to the probe data associated with the geographic region includes: normalizing the received probe data based, at least in part, on a road segment along which the probe data was captured; and rasterizing the normalized received probe data to generate the image corresponding to the probe data associated with the geographic area. Normalizing the received probe data based, at least in part on the road segment along which the probe data was captured includes, in some embodiments, normalizing the received probe data based, at least in part, on at least one of a functional class of the road segment along which the probe data was captured or a volume of received probe data along the road segment along which the received probe data was captured. According to some embodiments, rasterizing the received probe data to generate an image corresponding to the probe data associated with the geographic area includes: normalizing the received probe data based, at least in part, on a road segment along which the received probe data was captured, where normalization includes sampling the received probe data at different sampling rates or at different time periods based on at least one of a functional class of the road segment along which the received probe data was captured or a volume of received probe data along the road segment along which the received probe data was captured; and rasterizing the normalized received probe data to generate the image corresponding to the probe data associated with the geographic area.

Embodiments provided herein include a computer program product including at least one non-transitory computer-readable storage medium having computer-executable program code instructions stored therein, the computer-executable program code instructions including program code instructions to: receive probe data from a plurality of probe apparatuses within a geographic area, where the probe data includes location information and time information; rasterize the received probe data to generate an image corresponding to the probe data associated with the geographic area, where each pixel of the image includes a property representing at least one component of the probe data; process the image to obtain one or more map elements; and update a map database with the one or more map elements.

According to an example embodiment, the program code instructions to rasterize the received probe data to generate the image corresponding to the probe data associated with the geographic area include program code instructions to rasterize the received probe data to generate a first image corresponding to a first map tile and a second image corresponding to a second map tile, where the first image overlaps the second image by a predetermined amount. The property representing at least one component of the probe data includes, in some embodiments, pixel values, where pixel values for pixels in an area of the first image overlapping the second image are inferred based on corresponding pixels in an overlapped area of the second image. According to some embodiments, pixel values for the pixels in the area of the first image overlapping the second image proximate a border of the first image are determined based on pixel values of the corresponding pixels in the overlapped area of the second image.

According to some embodiments, the property representing at least one component of the probe data includes a pixel value, and the at least one component of the probe data includes a probe density represented by the pixel value. The property representing at least one component of the probe data includes, in some embodiments, a pixel value where the at least one component of the probe data includes an average probe speed represented by the pixel value. The property representing at least one component of the probe data includes, in some embodiments, a pixel value where the at least one component of the probe data includes a predominant probe heading represented by the pixel value.

According to certain embodiments, the program code instructions to rasterize the received probe data to generate an image corresponding to the probe data associated with the geographic area include program code instructions to: normalize the received probe data based, at least in part, on a road segment along which the received probe data was captured; and rasterize the normalized received probe data to generate the image corresponding to the probe data associated with the geographic area. According to some embodiments, the program code instructions to normalize the received probe data based, at least in part, on the road segment along which the received probe data was captured include program code instructions to normalize the received probe data based, at least in part, on at least one of a functional class of the road segment along which the probe data was captured or a total volume of received probe data along the road segment along which the received probe data was captured. The program code instructions of some embodiments to rasterize the received probe data to generate the image corresponding to the probe data associated with the geographic area include program code instructions to: normalize the received probe data based, at least in part, on at least one of a road segment along which the probe data was captured or a volume of received probe data along the road segment along which the received probe data was captured, where normalization includes sampling the received probe data at different sampling rates or at different time periods based on a functional class of the road segment along which the received probe data was captured, and rasterize the normalized received probe data to generate the image corresponding to the probe data associated with the geographic area. Also, a computer program product may be provided. For example, a computer program product comprising instructions which, when the program is executed by a computer, cause the computer to carry out the steps described herein.

Embodiments provided herein include an apparatus including: means for receiving probe data from a plurality of probe apparatuses within a geographic area where the probe data includes location information and time information; means for rasterizing the received probe data to generate an image corresponding to the probe data associated with the geographic area, where each pixel of the image includes a property representing at least one component of the probe data; means for processing the image to obtain one or more map elements; and means for updating a map database with the one or more map elements. The geographic area of an example embodiment is a first geographic area, the apparatus further including: means for receiving a ground truth image of labeled road feature representations, where the ground truth image covers a second geographic area, at least partially overlapping the first geographic area, where the means for processing the image to obtain one or more map elements includes means for processing the image and the ground truth image using a generator network to generate one or more map elements within the image.

According to some embodiments, the property representing at least one component of the probe data includes a pixel value, where the at least one component of the probe data includes a probe density represented by the pixel value. The property representing at least one component of the probe data includes, in some embodiments, a pixel value where the at least one component of the probe data includes an average probe speed represented by the pixel value. The property representing at least one component of the probe data includes, in certain embodiments, a pixel value where the at least one component of the probe data includes a predominant probe heading represented by the pixel value.

According to certain embodiments, the means for rasterizing the received probe data to generate an image corresponding to the probe data associated with the geographic region includes: means for normalizing the received probe data based, at least in part, on a road segment along which the probe data was captured; and means for rasterizing the normalized received probe data to generate the image corresponding to the probe data associated with the geographic area. The means for normalizing the received probe data based, at least in part on the road segment along which the probe data was captured includes, in some embodiments, means for normalizing the received probe data based, at least in part, on at least one of a functional class of the road segment along which the probe data was captured or a total volume of received probe data along the road segment along which the received probe data was captured. According to some embodiments, the means for rasterizing the received probe data to generate an image corresponding to the probe data associated with the geographic area includes: means for normalizing the received probe data based, at least in part, on at least one of a road segment along which the received probe data was captured or a volume of received probe data along the road segment along which the received probe data was captured, where normalization includes sampling the received probe data at different sampling rates or at different time periods based on a functional class of the road segment along which the received probe data was captured; and means for rasterizing the normalized received probe data to generate the image corresponding to the probe data associated with the geographic area.

BRIEF DESCRIPTION OF THE DRAWINGS

Figure 1:
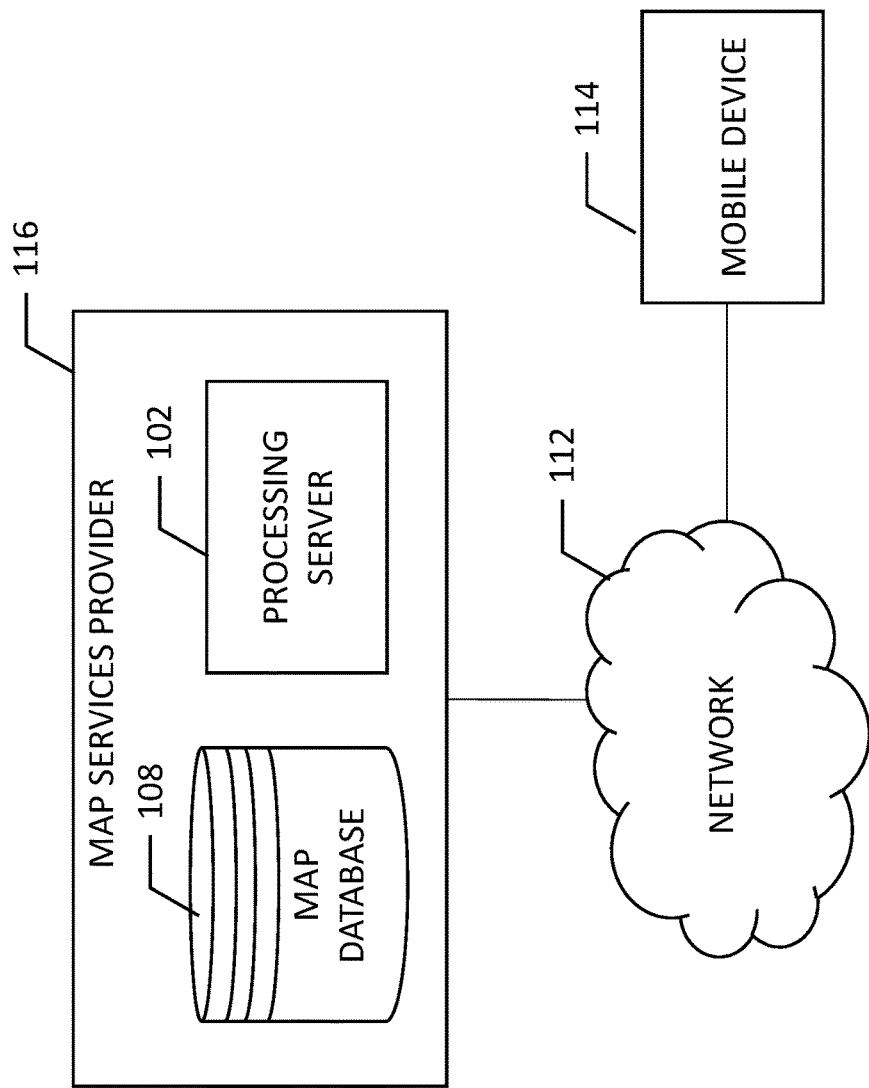
Figure 2:
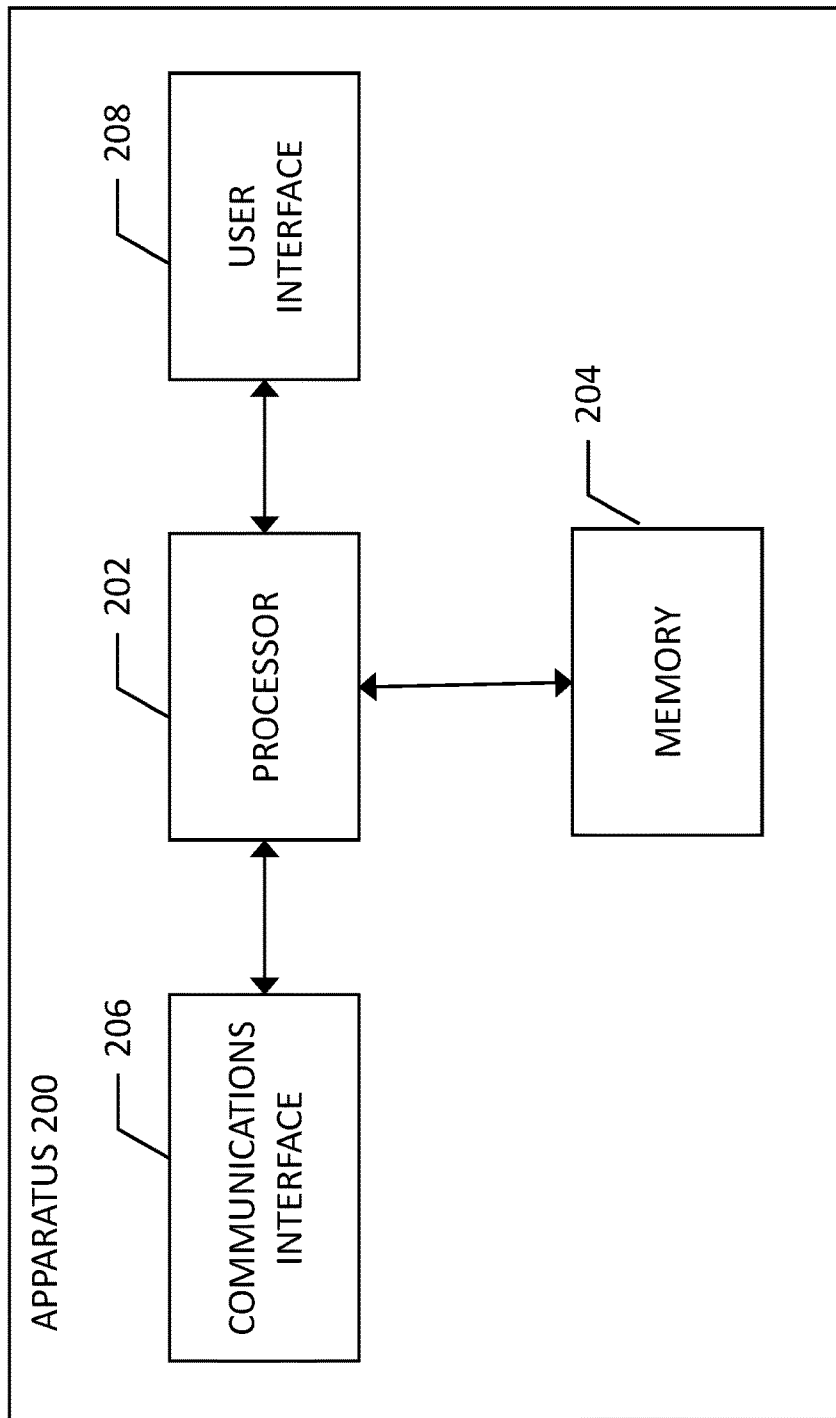
Figure 3:
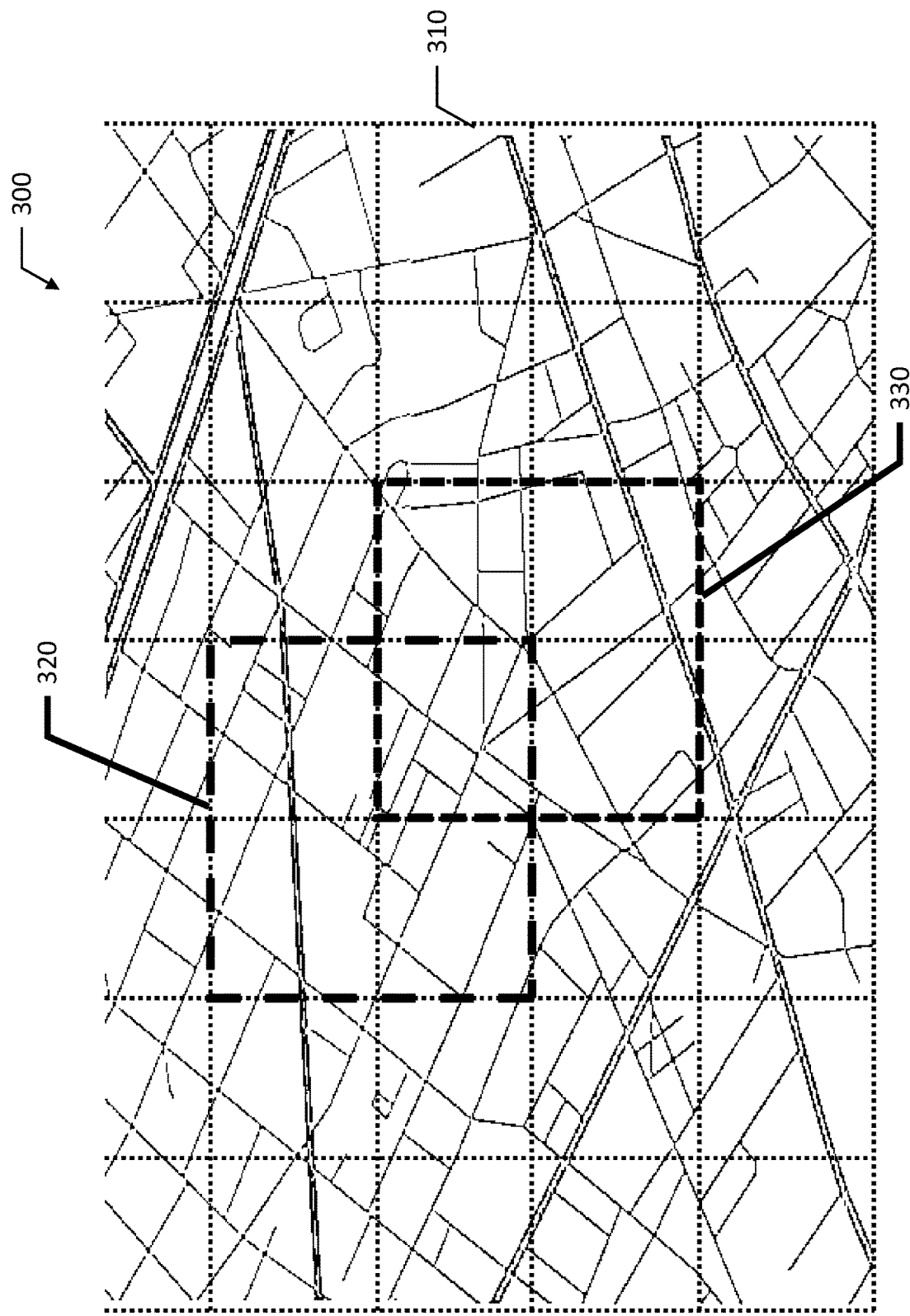
Figure 4:
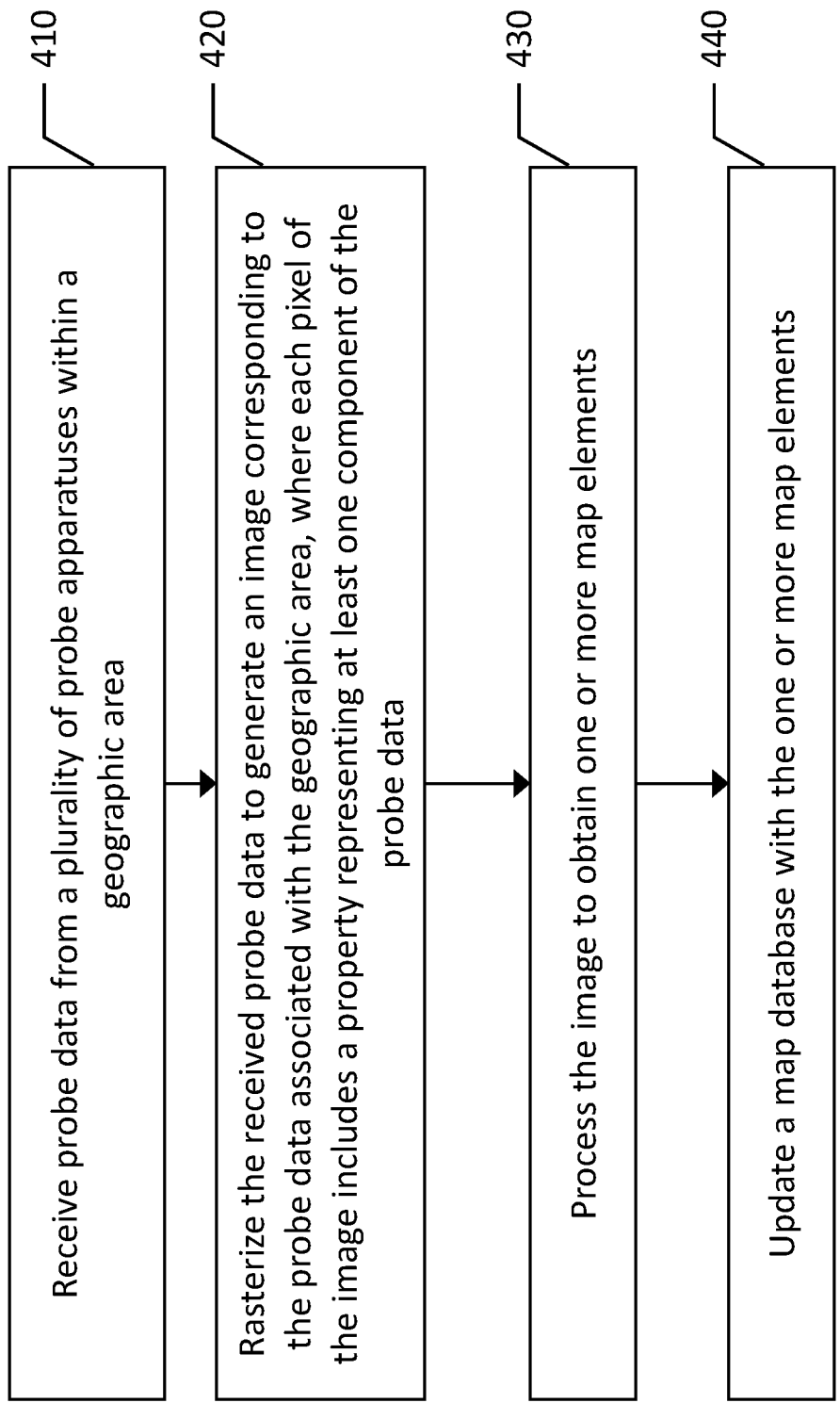

Having thus described example embodiments of the disclosure in general terms, reference will now be made to the accompanying drawings, which are not necessarily drawn to scale, and wherein:

FIG. 1 illustrates a communication diagram of a system for implementing example embodiments described herein according to an example embodiment of the present disclosure;

FIG. 2 is a block diagram of an apparatus for generating images from probe data according to an example embodiment of the present disclosure;

FIG. 3 illustrates an image created from probe data including two overlapping image areas according to an example embodiment of the present disclosure; and FIG. 4 is a flowchart of another method of generating an image from probe data for use in determining map elements within a geographic region according to an example embodiment of the present disclosure.

DETAILED DESCRIPTION

Example embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

A system, method, apparatus, and computer program product are provided herein in accordance with an example embodiment for generating and correcting lane geometry within map data, and more particularly, to generation of map geometry through rasterization of probe intensity measures over time, where the generated map geometry can be used for map element generation. Road segment paths and lane line geometry are often generated through automated means. However, manual verification and correction is often necessary due to the unique properties of roads in different and unique contexts. As such, even automated means rely heavily on manual processes that are laborious, time intensive, and costly. Because millions of miles of roads exist, the determination of road segment and lane line geometry can be a tedious process. Embodiments described herein provide a reliable manner of generating images from probe data to define various aspects of map geometry such as road segment paths, lane line geometry, object detection, traffic determination, and the like. Images are generated from probe data through rasterization of available probe data to generate a graphical representation of probe data that can be used in a variety of processes for map generation, map healing, and dynamic map data.

As technology advances, the data available for collection has increased in volume, such as with location data from personal hand-held devices and vehicles. Further, data from sensors attached to located vehicles (e.g., image sensors, LiDAR (light distancing and ranging), etc.) and satellite imagery further enhances location data. The available data includes vast amounts of useful information, some of which is time sensitive. For example, traffic jams caused by accidents may be resolved after one hour, but within that one hour the information about the accident and the traffic jam is very valuable and informative to others traveling near the location of the accident. To harness the power of this huge volume of data in a timely fashion, it is beneficial to be able to process the data in an automatic fashion, eliminating or minimizing human interventions that are typically expensive and time consuming.

Generating map data such as road or lane geometries and traffic volumes thereon directly from probe data is challenging. Probe data refers to any data containing a location (e.g., Global Navigation Positioning System location data of which examples include GPS (Global Positioning System), GLONASS (Global Navigation Satellite System), Galileo, etc.) collected by devices while moving within an environment. Such devices can include mobile devices (e.g., cell phones), vehicles (e.g., navigation systems), or the like. Such data often includes trajectories, each recording a trip made by a device or vehicle with timestamps associating location coordinates with a time at the location. Location data from vehicles, either collected from the vehicles or from mobile devices traveling within the vehicles, generally includes location data reflecting the path of underlying roads and lanes thereof, and likely real time information (e.g., traffic) that are not yet reflected anywhere. Extracting the underlying map from a large collection of such data is challenging.

Embodiments described herein formulate the problem as a vision problem and benefit from computer vision processes to improve functionality and efficiency. By converting probe data into histogram intensity images, embodiments described herein can employ, among other image processing models and algorithms, image deblurring techniques to restore the location data to a road segment or lanes of the road segment. Embodiments described herein differ from the prior art at least in that embodiments are in the pure image domain. According to certain embodiments described herein, both the input and the output are images. The expected outputs of certain embodiments are images of deblurred, clean lines of roads or lanes. The inputs of such embodiments are images of probe density intensities, which can be considered as the blurred versions of the output images. By formatting the problem in the image domain, it is possible to employ image models to solve the problems addressed herein. The data preparation pipeline of an example embodiment serves two purposes: initially to create training data (e.g., pairs of probe density histogram images and corresponding road geometry labels); and to generate input data (e.g., probe density histogram images) from the probe data for interference areas.

According to example embodiments described herein, probe data is received from a plurality of probe devices within a geographic region. Probe devices can include, for example, mobile devices (e.g., cell phones), vehicles, wearable devices, or any device that can provide at least location and an associated time stamp. The probe data is generated in tabular form, including location information such as with latitude and longitude and the corresponding time stamp. Various other data can be provided in the probe data, such as heading, speed, altitude, trajectory identifiers, etc. However, the location and time is fundamental. From the tabular probe data, an image is generated through converging histogram counting. A probe density image of an example embodiment includes georeferenced data such that the position of each probe data point is mapped to an image histogram pixel covering a specific footprint on the ground. The mapping of probes to histogram bins may also be performed for larger geographical areas where a geographical area is represented (e.g., in tabular form where each cell is a histogram bin) and from which images can later be extracted. Using such a large tabular representation is particularly advantageous when deriving overlapping images. This rasterization of probe data generates an image from the probe data reflecting at least a location of probe data within an environment. The images can be in the form of tiles, with tiles representing a defined portion of the geographic region. According to an example embodiment, each pixel of a tile may represent an area of 0.5 meters by 0.5 meters. While the shape of a tile need not be square, and in many cases the tiles are not square due to curvature of the earth and respective latitude/longitude lines, tiles may be generally referred to as squares or approximate squares. The tile of an example embodiment is made up of 256 pixels along a first axis (e.g., latitude) and 256 pixels along a second axis (e.g., longitude). The value of a pixel in the tile reflects the probe count at that tile over a time window (e.g., over the past fifteen minutes when used for dynamic data such as traffic, or a matter of days when used for generating static map data such as road geometry).

The rasterization of probe data to form images can be images reflecting a period of time, as noted above, with shorter duration time windows reflecting dynamic probe data and longer periods of time better reflecting less dynamic or static probe data. The images created through the rasterization of probe data can be used in a variety of manners to generate map data and to repair map data geometries. Different image processing functions and algorithms can be applied to the images according to how the data is to be used, such as through use of deblurring, map data extraction, YOLO (You Only Look Once) object detection, etc. A generator network can be used to generate map objects from the probe density histogram images. The generator learns to generate plausible data, where a discriminator may be used in a Generative Adversarial Network (GAN) to discriminate between real data and artificial data. The GAN is trained on ground truth (labeled) data and corresponding histogram images, such that the generator learns to produce accurate map objects from the histogram images. The goal of the generator is to produce objects sufficiently plausible that the discriminator believes them to be real. In this way, the generator can be used to generate map objects from probe density histogram images.

While the above described image is generated from probe data location and time, other channels can be employed to render the image more data rich and more useful for additional image processing purposes. Channels, which in an image can be represented by different colors, can be used to encode different elements of probe data. The different elements of the probe data, such as travel speed (e.g., average probe speed), can be encoded into different colors. For example, in an image created with three color channels of Red, Blue, and Green, each color can represent a different component of the probe data. As an example, red can correspond to a speed of probes at a particular pixel corresponding to a particular location, blue can correspond to an average heading angle at the particular location, and green can correspond to lane marking observations from real sensor data (e.g., cameras or image sensors) at the particular location, with an intensity of the pixel hue corresponding to a probe data point count at the particular location. More information can be encoded in additional channels beyond those identified above. An arbitrary number N of different probe data components may be encoded into N image channels.

FIG. 1 illustrates a communication diagram of an example embodiment of a system for implementing example embodiments described herein. The illustrated embodiment of FIG. 1 includes a map services provider system 116, a processing server 102 in data communication with a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map services provider 116 may include computer systems and a network of a system operator. The processing server 102 may include the map database 108, such as provided by a remote map server. The network may be wired, wireless, or any combination of wired and wireless communication networks, such as cellular, Wi-Fi, internet, local area networks, or the like.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn paths there through. Thus, it is important to have continuous features remain continuous within the map data as provided by embodiments herein.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Additional data sources can include OEM vehicles that may provide camera images, camera detections, radar information, LiDAR information, ultrasound information, and/or other sensing technologies. Also, remote sensing, such as through the use of probe data and gathered imagery, can be used to generate map geometries directly or through image processing techniques and through machine learning techniques as described herein. The map database 108 may include the digital map data for a geographic region or for an entire mapped space, such as for one or more countries, one or more continents, etc. The map database 108 may partition the mapped space using spatial partitions to segment the space into map tiles that are more manageable than the entire mapped space.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems including in conjunction with autonomous and semi-autonomous navigation systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. The compilation to produce the end user databases can be performed by a party or entity separate from the map services provider. For example, a customer of the map services provider, such as a navigation services provider or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In certain embodiments, the end user device or mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. End user devices may optionally include automated computer systems, such as map data service provider systems and platforms as the map may be processed, utilized, or visualized via one or more other computing systems. An end user can use the mobile device 114 for navigation and map functions such as guidance and map display, for example, and for determination of one or more personalized routes or route segments based on one or more calculated and recorded routes, according to some example embodiments.

While the mobile device 114 may be used by an end-user for navigation, driver assistance, or various other features, the mobile device 114 may provide map data to the map services provider 116 for purposes of updating, building, restoring, or repairing the map database 108, for example. The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. The probe data may also include speed and direction in some embodiments, such as when probe data is used to facilitate vehicle traffic speed determination. While probe data is described herein as being vehicle probe data, example embodiments may be implemented with pedestrian probe data, marine vehicle probe data, or non-motorized vehicle probe data (e.g., from bicycles, skateboards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present disclosure for revising map geometry based on a detailed analysis of probe data and existing map geometry. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. Embodiments described herein can further employ a processor embodied by a Graphics Processing Unit (GPU) specifically configured for neural network implementations and/or image processing capitalizing on efficient processing capabilities using multiple parallel operations As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Embodiments described herein construct images from probe data that can be used for map generation and healing, along with establishing dynamic map data. Embodiments generally form images from probe data through rasterization. For map generation, where substantially static map data is used, probe data densities can inform map objects and features. As used herein, the term static map data or substantially static map data references map data that does not regularly change, but can change over time such as when road paths change due to construction or long-term road closures. Conversely, dynamic map data references map data that changes regularly, such as traffic map data, temporary lane closures, accidents, and the like, that generally last less than a few hours. Thus, static map data can be considered map data that is persistent for twenty four hours or longer, while dynamic map data generally changes over time periods of less than twenty four hours.

To construct images of probe densities, embodiments described herein establish image size, resolution, and number of channels to be implemented. To be able to use available vision models and image processing models and algorithms, a selected image size may include 256-pixels by 256-pixels. However, different dimensions can be defined depending on the input requirements of the model or algorithm. The resolution of the images needs to be high enough such that higher levels of accuracy of final map contents can be expected, but also need to be reasonable enough for computational purposes. Depending upon the final requirements of the image, the resolution could range from about three meters per pixel to as low as around ten centimeters per pixel. An example embodiment described herein uses fifty centimeters per pixel as a resolution that is fine enough for most current use cases, but low enough that processing is not unreasonably challenging. As processing costs are reduced through technology, finer resolutions may be more conventionally employed. Tiles in the global context can be of any shape; however, embodiments described herein use a shape of almost square, with small vertical variation depending on latitude, and the tiles proximate the equator being closer to square. This tile size and shape is chosen to cover lanes and road shapes accurately, while other sizes and shapes may be selected based on the use case.

A resultant image is output covering an area, such as 300 meters by approximately 300 meters. For other choices of initial tile size and image size, the output level can change accordingly. To improve the efficiency of mapping of each pixel within the image to an actual location, a regular tiling scheme can be employed so that each pixel in the image corresponds to one tile of a given level determined by a resolution of the pixel. A tiling scheme where different levels correspond to different resolutions can be used whereby a tile at a given level (e.g., level 18) covers 300 m by 300 m. A standardization of tile levels and sizes improves the efficiency and correspondence between map versions and map updates.

While probe data can include probe count or probe density at a pixel, average probe speed at a pixel, and average probe heading at a pixel, the data encoded in a pixel can extend beyond this information. For example, data encoded at a pixel at a given location can be data from other sources. For instance, a gray-scale value of the corresponding pixel of a satellite image. Optionally, probe data can include real sensor data that includes information regarding lane marking observations. Real sensor data or RSD is data gathered from sensors within an environment, such as sensors of an autonomous or semi-autonomous vehicle. The RSD can include image data or LIDAR data from sensors of a vehicle as it travels within an environment.

Embodiments provided herein employ machine learning to train image detection using training images to properly identify road and lane geometry and to identify road objects such as lane lines, poles, signs, and boundaries from rich sensor data from vehicles. To perform such training, a training area is provided that can be subdivided into an overlapping grid of training images. FIG. 3 illustrates an example embodiment of a training area 300 that is subdivided into a grid of training images with grid lines 310. The grid lines subdivide the training area into images that have the same angular extent in width and height and thus cover a longer height extent on the ground than the image width for the latitude.

A first image is illustrated by border 320 and a second image is illustrated by border 330. By overlapping the images, it is ensured that during inference, there is overlapping inferred geometry to yield seamless geometry extent since there may be inferred artifacts or gaps at the image boundaries. The overlap, which is by 50% along each axis in the example embodiment of FIG. 3, is intentional. Borders between image tiles pose issues where elements proximate a border can become discontinuous across borders. By overlapping images, boundary issues are eliminated. According to an example embodiment, based on the overlap, 25% of the image proximate the border is trimmed from each overlapped image to obtain a series of images that lack border constraints and associated accuracy issues. Inferred pixels away from borders between two overlapping images are more accurate and avoid the issues borders pose between two images, such as discontinuities.

As noted above, different channels of the image can encode different information about the pixels of the tiles. The first channel which has the greatest utility for map building is the intensity of the probe data in each pixel. This number is calculated by aggregating the number of probes observed in the respective pixel over a given time window. Depending on the intended use of the rasterized probe data image, different kinds of information can be encoded in the second to fourth or even higher channels of the image. An example for such information includes: average speed of probes observed in a pixel over a given time window as a second channel; and most probable heading of probes observed in each pixel over a given time window as a third channel.

Different channels of the image can be used to combine data from different sources. One example embodiment includes an intensity of probes (e.g., count) in the first channel as above, the intensity of extracted real world observations from cameras in the second channel (such as e.g., lane markings), and the gray-scaled satellite image at the pixel in the third channel. Other information that can be encoded into different channels of an image (and values for each pixel) include GNSS satellite count, precision/accuracy estimates for GNSS location, encoded probe trajectory information, turn probabilities, etc. To avoid saturation of the histogram, such as with areas of very high probe content, histogram normalization techniques can be applied to the images.

Depending upon a number of bits per pixel, the probe histogram count may require normalization. If only 8-bits are available, the maximum pixel value is limited to 255. Highways typically have much higher probe density than roads of a lower functional class (e.g., residential roads), and since images may contain both roads with high probe density and low probe density at the same time, it is important to preserve the dynamic range in the images. Without normalization, it may be necessary to clip the maximum pixel probe count (e.g., to 255 for 8-bit images), and this may yield a flat clipped probe histogram image for roads with high probe density. Some clipping may, however, be appropriate in cases where there are outlier spikes in the histogram, such as due to probe artifacts including stationary probe clusters (e.g., parking lots) or due to errors in probe data (e.g., in urban canyons).

To avoid clipping, embodiments can employ image equalization techniques that can map the histogram image into a fixed pixel range. Embodiments can further invert the image pixel intensity value (for better visualization) such that background (non-road) pixels are displayed in white. This enables use of datasets from roads in the same image with different levels of probe density (e.g., multiple road functional classes in the same image). The normalization techniques can be applied to the different channels independently on a per-channel basis as needed. The issue of saturation can be addressed by capturing probe data during varying time periods in dependence of a functional class of the road or by sampling at a higher/lower frequency selected based on the functional class of a road.

According to some embodiments, instead of having to compress high dynamic histograms to fit into a maximum pixel value by normalization or clipping, embodiments can employ variable sampling schemes. One such scheme is variable frequency, where roads of functional classes FC1 and FC2 such as highways with high traffic volumes are sampled less frequently than less driven residential roads, such as in functional classes FC4 and FC5. Optionally, the sampling time window may be varied based on how frequently certain roads are driven, such that FC1 and FC2 highways are sampled over a shorter time range compared to less driven roads such as FC4 and FC5 road that can be sampled over longer time windows. Notably, using non-uniform time windows may not be optimal for road geometry change detection.

According to an example embodiment, training label data for road feature detection cases can be processed by rasterizing high definition road geometry. Features of the road geometry, such as width or length of the lines, can be adjusted to provide a target equivalent feature in raster form. Input images for training, validation/test, and label data, can be read directly from sources into multidimensional arrays (tensors) skipping intermediate file formats such as image file formats including conventional bitmaps, pngs, jpegs, etc.

Calculating probe statistics for each pixel can be computationally intensive as the underlying probe volume could be in the millions or potentially billions, particularly as probe devices proliferate. To be able to process the data in a timely manner is crucial to extract real-time information when processing dynamic map data. Aggregation of the relevant probe points is performed in an example embodiment by an aggregating query from a large in-memory database. The obtained aggregated probe data points are then forwarded to parallelized instances that perform the histogram-to-raster conversion for outputting images, either in image format or in multi-dimensional arrays/tensors corresponding to the garget image size manageable by the image data model of choice. Using this process, data processing for an area of three kilometers by three kilometers can be performed efficiently, such as within seconds or minutes.

Creating rasterized probe data facilitates map healing and generation and can provide dynamic map data accurately and quickly while reducing processing requirements and capitalizing on image analysis models and algorithms.

Probe data gathered from a plurality of probes traveling within a road network can be used to produce images which can be filtered and/or analyzed to discover road geometry and lane geometry lines in addition to data encoded in other channels of the image pixels. The probe images can be used as input to a probe point analysis such as using principal component analysis (PCA), Bayesian filtering, generator model, or other suitable method to determine lane line geometry.

Road geometry and lane line geometry of example embodiments provided herein can be instrumental in establishing turn maneuvers at intersections. When incorrect lane line geometry exists, such as historical lane data that has been changed, lane line geometry cannot reliably be used by autonomous vehicles for autonomous control through the region of incorrect lane lines. While autonomous vehicles can employ sensor data collected on board the vehicle for control within an environment, the use of road geometry and lane line geometry enhances autonomous vehicle control and provides redundancy that improves efficiency, effectiveness, and safety of autonomous vehicle control. The efficient methods described herein rasterize probe data to generate images such that the problem of road geometries and lane line geometries can be solved through image processing techniques.

FIG. 4 illustrates a flowchart depicting methods according to example embodiments of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present disclosure and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

An operation of an example apparatus will herein be described with reference to the flow chart of FIG. 4. The illustrated method may be performed, for example, by apparatus 200 using processor 202 with program code instructions stored in memory 204 to cause the apparatus to perform the operations of the method of FIG. 4. As shown, apparatus is caused to receive probe data from a plurality of probe apparatuses within a geographic area at 410. The received probe data is rasterized to generate an image corresponding to the probe data associated with the geographic area, where each pixel of the image includes a property representing at least one component of the probe data at 420. The image is processed at 430 to obtain one or more map elements. A map database is updated at 440 with the one or more map elements.

In an example embodiment, an apparatus for performing the method of FIG. 4 above may include a processor (e.g., the processor 202) configured to perform some or each of the operations (410-440) described above. The processor may, for example, be configured to perform the operations (410-440) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 410-440 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the at least one processor, cause the apparatus to at least:
receive probe data from a plurality of probe apparatuses within a geographic area, wherein the probe data comprises location information and time information;

rasterize the received probe data to generate a first image corresponding to a first map tile and a second image corresponding to a second map tile, the first image and the second image corresponding to the probe data associated with the geographic area, wherein each pixel of the first image and the second image is encoded with at least one property representing at least one component of the probe data associated with map geometry, wherein the at least one component comprises one or more of a travel speed or an average heading angle, and wherein the first image overlaps the second image by a predetermined amount less than complete overlap;

process the first image and the second image to obtain one or more map elements; and update a map database with the one or more map elements.

2. The apparatus of claim 1, wherein the at least one property representing at least one component of the probe data comprises pixel values, wherein pixel values for pixels in an area of the first image overlapping the second image are inferred based on corresponding pixels in an overlapped area of the second image.

3. The apparatus of claim 2, wherein pixel values for pixels in the area of the first image overlapping the second image proximate a border of the first image are determined based on pixel values of the corresponding pixels in the overlapped area of the second image.

4. The apparatus of claim 1, wherein the at least one property representing at least one component of the probe data comprises a pixel value, and wherein the at least one component of the probe data comprises a probe density represented by the pixel value.

5. The apparatus of claim 1, wherein the at least one property representing at least one component of the probe data comprises a pixel value, and wherein the at least one component of the probe data comprises a predominant probe heading represented by the pixel value.

6. The apparatus of claim 1, wherein causing the apparatus to rasterize the received probe data to generate an image corresponding to the probe data associated with the geographic area comprises causing the apparatus to:

normalize the received probe data based, at least in part, on a road segment along which the received probe data was captured; and rasterize the normalized received probe data to generate the first image corresponding to the probe data associated with the geographic area.

7. The apparatus of claim 6, wherein causing the apparatus to normalize the received probe data based, at least in part, on the road segment along which the received probe data was captured comprises causing the apparatus to:

normalize the received probe data based, at least in part, on at least one of a functional class of the road segment along which the probe data was captured or a volume of received probe data along the road segment along which the received probe data was captured.

8. The apparatus of claim 1, wherein causing the apparatus to rasterize the received probe data to generate the first image corresponding to the probe data associated with the geographic area comprises causing the apparatus to:

normalize the received probe data based, at least in part, on a road segment along which the received probe data was captured, wherein normalization comprises sampling the received probe data at different sampling rates or at different time periods based on at least one of a functional class of the road segment along which the received probe data was captured or a volume of received probe data along the road segment along which the received probe data was captured; and rasterize the normalized received probe data to generate the image corresponding to the probe data associated with the geographic area.

9. The apparatus of claim 1, wherein the at least one property representing at least one component of the probe data comprises a first pixel value and a second pixel value, and wherein the at least one component of the probe data comprises the travel speed represented by the first pixel value and the average heading angle represented by the second pixel value.

10. The apparatus of claim 9, wherein the first pixel value is encoded in a first channel of a pixel and the second pixel value is encoded in a second channel of the pixel.

11. A method comprising:

receiving probe data from a plurality of probe apparatuses within a geographic area wherein the probe data comprises location information and time information;

rasterizing the received probe data to generate a first image corresponding to a first map tile and a second image corresponding to a second map tile, the first image and the second image corresponding to the probe data associated with the geographic area, wherein each pixel of the first image and the second image is encoded with at least one property representing at least one component of the probe data associated with map geometry, wherein the at least one component comprises one or more of a travel speed or an average heading angle, and wherein the first image overlaps the second image by a predetermined amount less than complete overlap;

processing the first image and the second image to obtain one or more map elements; and updating a map database with the one or more map elements.

12. The method of claim 11, wherein the geographic area is a first geographic area, the method further comprising:

receiving a ground truth image of labeled road feature representations, wherein the ground truth image covers a second geographic area, at least partially overlapping the first geographic area, wherein processing the first image and the second image to obtain one or more map elements comprises processing the first image and the second image and the ground truth image using a generator network to generate one or more map elements within the image.

13. The method of claim 11, wherein the at least one property representing at least one component of the probe data comprises a pixel value, and wherein the at least one component of the probe data comprises a probe density represented by the pixel value.

14. The method of claim 11, wherein the at least one property representing at least one component of the probe data comprises a pixel value, and wherein the at least one component of the probe data comprises a predominant probe heading represented by the pixel value.

15. The method of claim 11, wherein rasterizing the received probe data to generate the first image corresponding to the probe data associated with the geographic area comprises:

normalizing the received probe data based, at least in part, on a road segment along which the received probe data was captured; and rasterizing the normalized received probe data to generate the first image corresponding to the probe data associated with the geographic area.

16. The method of claim 15, wherein normalizing the received probe data based, at least in part, on the road segment along which the received probe data was captured comprises:

normalizing the received probe data based, at least in part, on at least one of a functional class of the road segment along which the probe data was captured or a total volume of received probe data along the road segment along which the received probe data was captured.

17. The method of claim 11, wherein rasterizing the received probe data to generate an image corresponding to the probe data associated with the geographic area comprises:

normalizing the received probe data based, at least in part, on a road segment along which the received probe data was captured, wherein normalization comprises sampling the received probe data at different sampling rates or at different time periods based on at least one of a functional class of the road segment along which the received probe data was captured or a volume of received probe data along the road segment along which the received probe data was captured; and rasterizing the normalized received probe data to generate the first image corresponding to the probe data associated with the geographic area.

18. A computer program product comprising at least one non-transitory computer-readable storage medium having computer-executable program code instructions stored therein, the computer-executable program code instructions comprising program code instructions to:

receive probe data from a plurality of probe apparatuses within a geographic area wherein the probe data comprises location information and time information;

rasterize the received probe data to generate a first image corresponding to a first map tile and a second image corresponding to a second map tile, the first image and the second image corresponding to the probe data associated with the geographic area, wherein each pixel of the first image and the second image is encoded with at least one property representing at least one component of the probe data associated with map geometry, wherein the at least one component comprises one or more of a travel speed or an average heading angle, and wherein the first image overlaps the second image by a predetermined amount less than complete overlap;

process the first image and the second image to obtain one or more map elements; and update a map database with the one or more map elements.

19. The computer program product of claim 18, wherein the program code instructions to rasterize the received probe data to generate the first image corresponding to the probe data associated with the geographic area comprise program code instructions to:

normalize the received probe data based, at least in part, on at least one of a functional class of a road segment along which the received probe data was captured or a volume of received probe data along the road segment along which the received probe data was captured; and rasterize the normalized received probe data to generate the first image corresponding to the probe data associated with the geographic area.

* * * * *